United States Patent

[11] 3,633,301

[72] Inventor: Andre Calabuig, Tokyo, Japan
[21] Appl. No.: 873,846
[22] Filed: Nov. 4, 1969
[45] Patented: Jan. 11, 1972
[73] Assignee: Asahi Stereorama Co., Ltd., Tokyo, Japan
[32] Priority: Feb. 28, 1969
[33] Japan
[31] 44/17666, 44/17667, 44/17668

[54] APPARATUS FOR CREATING A THREE-DIMENSIONAL PICTURE
8 Claims, 10 Drawing Figs.

[52] U.S. Cl. .................................................. 40/160, 40/102, 46/34
[51] Int. Cl. .................................................. G09f 1/12
[50] Field of Search ........................................ 40/102, 106.1, 135, 158, 152; 350/167; 281/34

[56] References Cited
UNITED STATES PATENTS

| | | | |
|---|---|---|---|
| 2,514,814 | 7/1950 | Towne | 40/137 X |
| 2,522,812 | 9/1950 | Bonnet | 40/137 X |
| 2,740,954 | 4/1956 | Kleefeld | 350/167 X |
| 3,140,883 | 7/1964 | Anthony | 281/34 |
| 3,205,598 | 9/1965 | Grosse | 40/135 X |
| 3,264,767 | 8/1966 | Coffman | 40/102 |
| 3,268,238 | 8/1966 | Finkel | 40/135 X |

Primary Examiner—Robert W. Michell
Assistant Examiner—Wencelao J. Contreras
Attorney—Wenderoth, Lind & Ponack ABSTRACT: An apparatus creates a three-dimensional picture by selectively positioning a single lenticular sheet over a number of figure sheets having linear form three-dimensional figures thereon. The figure sheets are positioned on a baseplate. A frame member is hinged to said baseplate and has positioned therein the lenticular sheet. The frame member pivots around the baseplate until the lenticular sheet overlies the figure sheet. Alignment means ensure the proper alignment of the figure sheet and the lenticular sheet. Resilient means may be provided to urge the figure sheet against the lenticular sheet.

INVENTOR
ANDRE CALABUIG

INVENTOR
ANDRE CALABUIG

BY Wenderoth, Lind & Ponack
ATTORNEYS

APPARATUS FOR CREATING A THREE-DIMENSIONAL PICTURE

BACKGROUND OF THE INVENTION

The present invention relates to an apparatus for creating a three-dimensional picture of the type created when a lenticular sheet is placed over a three-dimensional figure sheet.

More specifically, the present invention relates to such an apparatus wherein a single lenticular sheet is adapted to be used with a number of three-dimensional figure sheets.

The figure sheet has printed thereon a linear form three-dimensional figure converted from a set of two-dimensional images taken by a special camera which takes pictures of a three-dimensional figure from several distinct angles at the same time. The lenticular sheet has one surface thereof formed into a plurality of semispherical lens elements which function to project a three-dimension image of the figure to the viewer.

In the past, such three-dimensional pictures have been produced by attaching a lenticular sheet to the top of a figure sheet by means of an adhesive.

However, these conventional three-dimensional pictures have several inherent disadvantages. Each picture requires a separate lenticular sheet. These lenticular sheets are usually made from transparent glass or plastic. Therefore, when several pictures are collected as a set, the set becomes heavy and bulky. In addition, the adhesive used to attach the lenticular sheet to the figure sheet tends to cloud and distort the image. Also, each lens of the lenticular sheet must have the same focal length to ensure proper focus of the image. Therefore, the cost of producing satisfactory lenticular sheets is relatively high, and the cost of each picture is increased.

With these disadvantages in mind, it is the object of the present invention to provide an apparatus for producing three-dimensional pictures wherein a single lenticular sheet is adapted to be selectively placed over a plurality of figure sheets.

According to the present invention, a single lenticular sheet is provided in a frame member, and a plurality of figure sheets are adapted to be positioned on a baseplate. The frame member is attached to the baseplate and is adapted to be pivoted to overlie a selected figure sheet positioned on the baseplate. According to one embodiment of the invention, the plurality of figure sheets may be physically attached to and aligned with the baseplate. In another embodiment of the invention, each figure sheet may be selectively positioned on the baseplate by means of aligning devices which operate to align the lenticular sheet with the figure sheet. In yet another embodiment of the invention, the baseplate may be provided with a resilient means which operates to press the figure sheet upwardly against the lenticular sheet to provide close contact therebetween and thereby ensure proper focus of the image.

The provision of a three-dimension picture creating device using only a single lenticular sheet is desirable in that it reduces the cost and the weight of the pictures. It also enables the viewer to keep the content of each figure sheet undisclosed until covered by the lenticular sheet.

Other features of the invention will be made clear by the following description, taken together with the accompanying drawings.

BRIEF DESCRIPTION OF THE DRAWINGS

Referring to FIGS. 1 and 2, the apparatus of one embodiment of the present invention comprises a baseplate 1 consisting of heavy paper of synthetic resin board or the like. A stack of figure sheets 2 are physically attached at their end portions 2b to one end portion 1b of the baseplate 1 by any suitable means such as spiral spring 3. The upper surfaces 2a of figure sheets 2 have printed thereon linear form three-dimensional figures 4. The figure sheets may be selectively rotated around spring 3 to position the desired three-dimensional figure 4 on top of the stack.

Lenticular sheet 4 is securely positioned in an opening in a frame member 6. The frame member 6 is attached to baseplate 1 in a suitable manner to be hinged around baseplate 1 such that lenticular sheet 5 overlies the three-dimensional figure 4 which is on top of the stack. In FIGS. 1 and 2, frame member 6 is integral with baseplate 1 with bend creases 7 provided therebetween. When the desired three-dimensional figure 4 is on top of the stack, frame member 6 is pivoted with respect to baseplate 1 at bend creases 7 to overlie the figure 4, as shown in the dashed lines in FIG. 2. In this manner, lenticular sheet 5 overlies three-dimensional figure 4 and is pressed down thereon, such that a three-dimensional picture is created for viewing by an observer. Spiral spring 3 acts to position the uppermost figure sheet 2 such that it will be properly aligned with lenticular sheet 5 when said lenticular sheet overlies said figure sheet.

Figure 1:
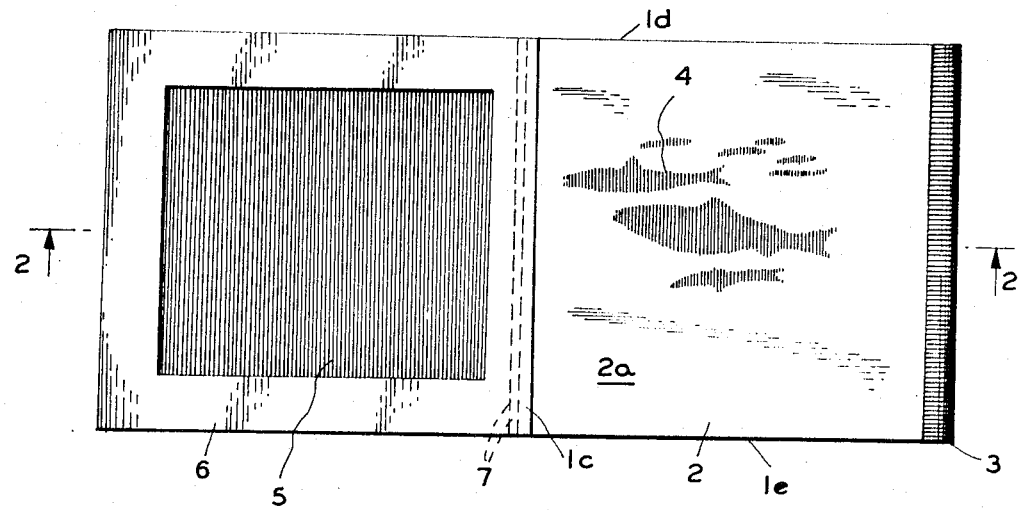
FIG. 1 is a plan view of a first embodiment of the present invention.
Figure 2:
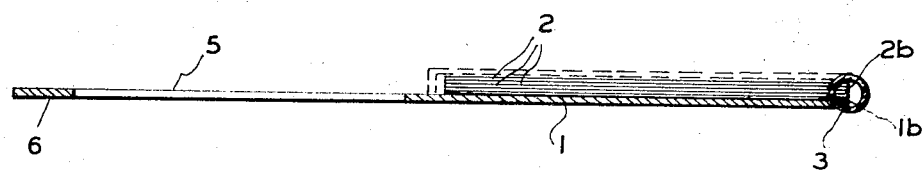
FIG. 2 is a sectional view taken along line 2—2 of FIG. 1.
Figure 5:
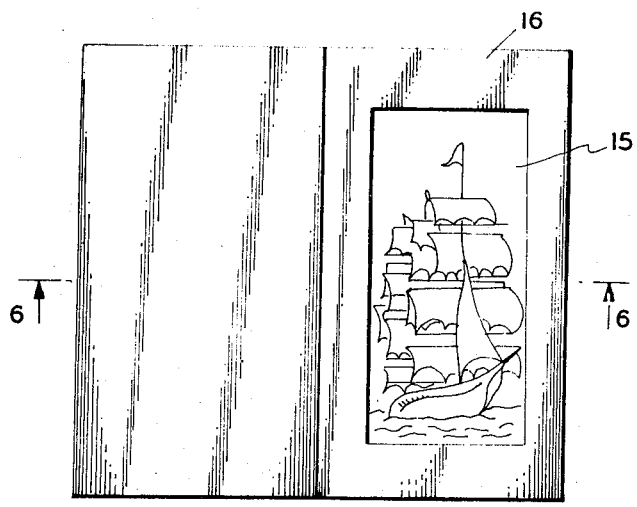
FIG. 5 is a plan view of the second embodiment of the invention in a closed or operative position.
Figure 6:
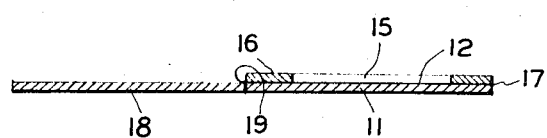
FIG. 6 is a sectional view taken along line 6—6 of FIG. 5.
Figure 3:
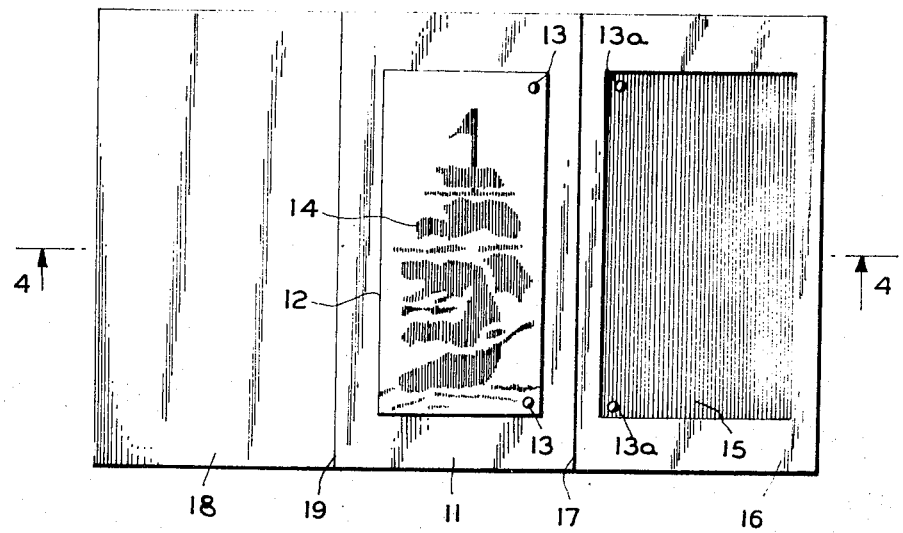
FIG. 3 is a plan view of a second embodiment of the present invention in an open position.
Figure 4:
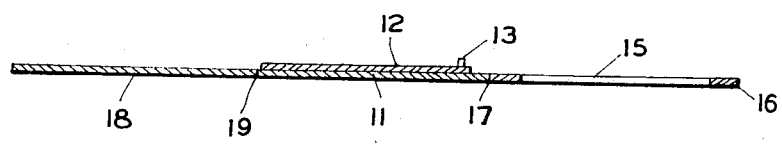
FIG. 4 is a sectional view taken along line 4—4 of FIG. 3.
Figure 7:
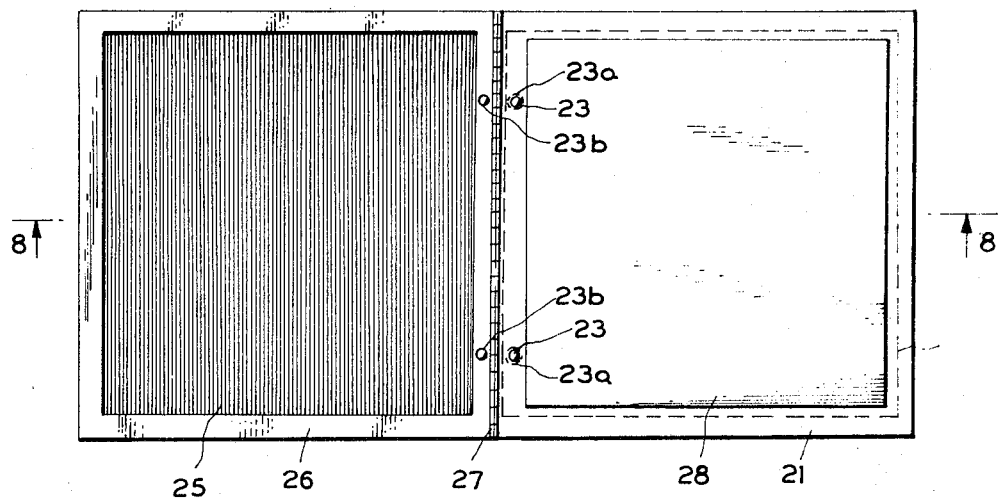
FIG. 7 is a plan view of a third embodiment of the present invention in an open position.

It is noted that frame member 6 is integral with baseplate 1 at end portion 1c. However, it is understood that frame member 6 could alternatively be integral with baseplate 1 at end portions 1d or 1e.

A second embodiment of the present invention will now be described with reference to FIGS. 3–6.

A baseplate 11, similar to baseplate 1 described above, has aligning means 13 rigidly fixed to the upper surface thereof. An individual figure sheet 12 has holes punched therein whereby said figure sheet is fixedly positioned on baseplate 11 by aligning means 13. Each figure sheet 12 has a linear form three-dimensional FIG. 14 on the upper surface thereof.

Lenticular sheet 15 is positioned in an opening in a frame member 15. Frame member 16 is attached by suitable means to baseplate 11. In the figures, frame member 16 is integral with baseplate 11, with bend crease 17 provided therebetween, whereby frame member 16 may be pivoted with respect to baseplate 11, such that lenticular sheet 15 overlies figure sheet 12. Lenticular sheet 15 is provided with alignment holes 13a which register with aligning means 13 when lenticular sheet 15 overlies figure sheet 12. Proper alignment between lenticular sheet 15 and figure sheet 12 is thereby ensured. Cover member 18 is integral with baseplate 11 and pivots at bend creases 19 to provide a cover when the apparatus is not in use.

When frame member 16 is pivoted around baseplate 11, lenticular sheet 15 is not only aligned with figure sheet 12, but it also rests smoothly thereon, to ensure proper focus of the image produced.

It will be observed that individual figure sheets 12 may be selectively positioned on baseplate 11, or several figure sheets may be positioned thereon to form a stack.

Figure 9:
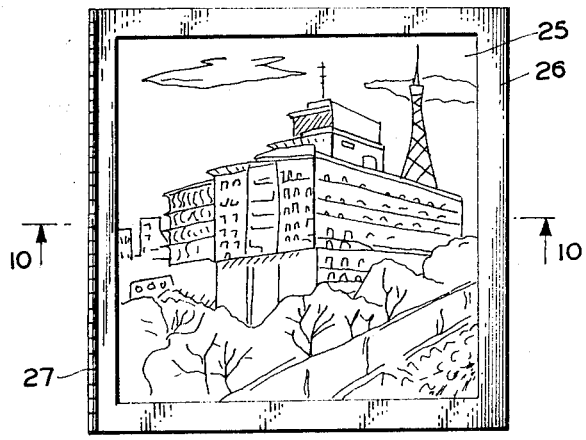
FIG. 9 is a plan view of the third embodiment of the invention in a closed or operative position.
Figure 10:
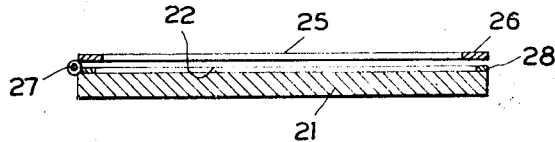
FIG. 10 is a sectional view taken along line 10—10 of FIG. 9.

A third embodiment of the present invention will now be described with reference to FIGS. 9–10.

Figure 8:
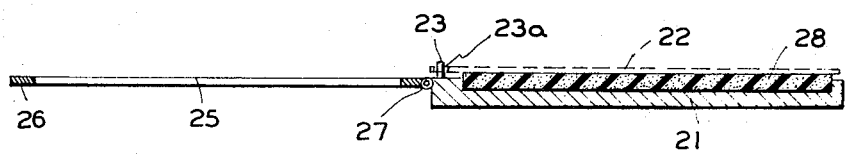
FIG. 8 is a sectional view taken along line 8—8 of FIG. 7.

A baseplate 21 is provided on the upper surface with a resilient layer 28 made of suitable material such as felt or sponge. Resilient layer 28 may rest on the upper surface of baseplate 21, as shown in FIG. 10 or it may be fitted in and extend above a recess in baseplate 21, as shown in FIG. 8. Aligning means 23 are rigidly fixed to the upper surface of baseplate 21. An individual figure sheet 22 has holes 23a punched therein whereby said figure sheet is fixedly positioned on baseplate 21 by aligning means 23.

Lenticular sheet 25 is positioned in an opening in a frame member 26. Frame member 26 is attached to baseplate 21 by any suitable means such as hinge 27. Alignment holes 23b are provided in frame member 26. Holes 23b register with aligning means 23 when frame member 26 is pivoted around hinge 27. Lenticular sheet 25 is thereby made to accurately align with figure sheet 22. Also, resilient layer 28 acts to press figure sheet 22 up against lenticular sheet 25, causing smooth contact therebetween, and ensuring proper focus of the image produced.

It will be observed that individual figure sheets 22 may be selectively positioned on baseplate 21, or several figure sheets may be positioned thereon to form a stack.

Although several embodiments of the invention have been described in detail, such description is intended to be illustrative only, and not restrictive, since many details of the construction of the invention may be altered or modified without departing from the spirit or scope of the invention.

What is claimed is:

1. An apparatus for creating a three-dimensional picture comprising a baseplate, at least one figure sheet having a linear form three-dimensional figure thereon and which is positioned in at least one of its positions on said baseplate, a frame member having an opening therein and pivotally attached to said baseplate, a lenticular sheet positioned in said opening, and means for aligning said figure sheet on said baseplate, whereby when said figure sheet is positioned on said baseplate and when said frame member is pivoted around said baseplate said lenticular sheet overlies said figure sheet and said three-dimensional picture is created.

2. An apparatus for creating a three-dimensional picture as claimed in claim 1, wherein said means for aligning comprises a spiral spring attaching a plurality of said figure sheets to said baseplate.

3. An apparatus for creating a three-dimensional picture as claimed in claim 1, wherein said means for aligning also aligns said figure sheet with said lenticular sheet and comprises means rigidly fixed to the upper surface of said baseplate.

4. An apparatus for creating a three-dimensional picture as claimed in claim 3, wherein said lenticular sheet has holes therein which are aligned with said means for aligning when said frame means is pivoted around said baseplate.

5. An apparatus for creating a three-dimensional picture as claimed in claim 3, wherein said frame member has holes therein which are aligned with said means for aligning when said frame means is pivoted around said baseplate.

6. An apparatus for creating a three-dimensional picture as claimed in claim 1, wherein said frame member is integral with said base member and has bend creases therein.

7. An apparatus for creating a three-dimensional picture as claimed in claim 1, wherein said frame member is pivoted to said baseplate by means of a hinge.

8. An apparatus for creating a three-dimensional picture as claimed in claim 1, further comprising a resilient layer mounted on the upper surface of said baseplate, whereby said resilient layer tends to urge said figure sheet upwardly against said lenticular sheet, causing smooth contact therebetween.

* * * * *